United States Patent [19]

Cucchi et al.

[11] Patent Number: 4,667,789
[45] Date of Patent: May 26, 1987

[54] CONTROL DEVICE FOR FEEDING METAL BARS FOR SUPPLYING AN AUTOMATIC MULTI-SPINDLE LATHE

[75] Inventors: Giovanni Cucchi; Pietro Cucchi, both of Milan, Italy

[73] Assignee: F. LLI Cucchi S.r.l., Milan, Italy

[21] Appl. No.: 706,870

[22] Filed: Feb. 28, 1985

[30] Foreign Application Priority Data

Mar. 9, 1984 [IT] Italy .................. 19988 A/84

[51] Int. Cl.⁴ ............... F16D 11/10; B23B 13/04
[52] U.S. Cl. .................. 192/48.91; 74/814; 82/3; 192/67 P; 192/93 R
[58] Field of Search ........... 192/48.1, 48.8, 48.9, 192/48.91, 93 R, 67 P; 82/3; 74/814, 825, 813 R

[56] References Cited

U.S. PATENT DOCUMENTS

| | | | |
|---|---|---|---|
| 1,693,645 | 12/1928 | Fahrney | 192/48.9 X |
| 2,491,859 | 12/1949 | Hijmans | 74/813 R X |
| 2,619,211 | 11/1952 | Belden | 192/67 P X |
| 2,965,208 | 12/1960 | Forster et al. | 74/813 X |
| 3,404,589 | 10/1968 | Brown et al. | 82/3 |
| 3,643,642 | 2/1972 | Junes | 192/67 P X |
| 4,604,924 | 8/1986 | Cucchi et al. | 82/2.7 |

Primary Examiner—Rodney H. Bonck
Attorney, Agent, or Firm—Shlesinger, Fitzsimmons & Shlesinger

[57] ABSTRACT

A device for controlling in sequence or at the same time the feed of metal bars into a suitable guide equipment for supplying the bars to an automatic multi-spindle lathe is described.

In order to connect the main control or drive to the bar feeding apparatus, the device includes a clutch, the coupling and decoupling of the clutch being caused by the rotation of the guide equipment. The portion of the clutch which is connected to the drive can rock around the axis of its support on the fixed frame during the coupling operation, and a return spring is provided to return rockable portion back to its starting position ready for the next coupling operation.

17 Claims, 13 Drawing Figures

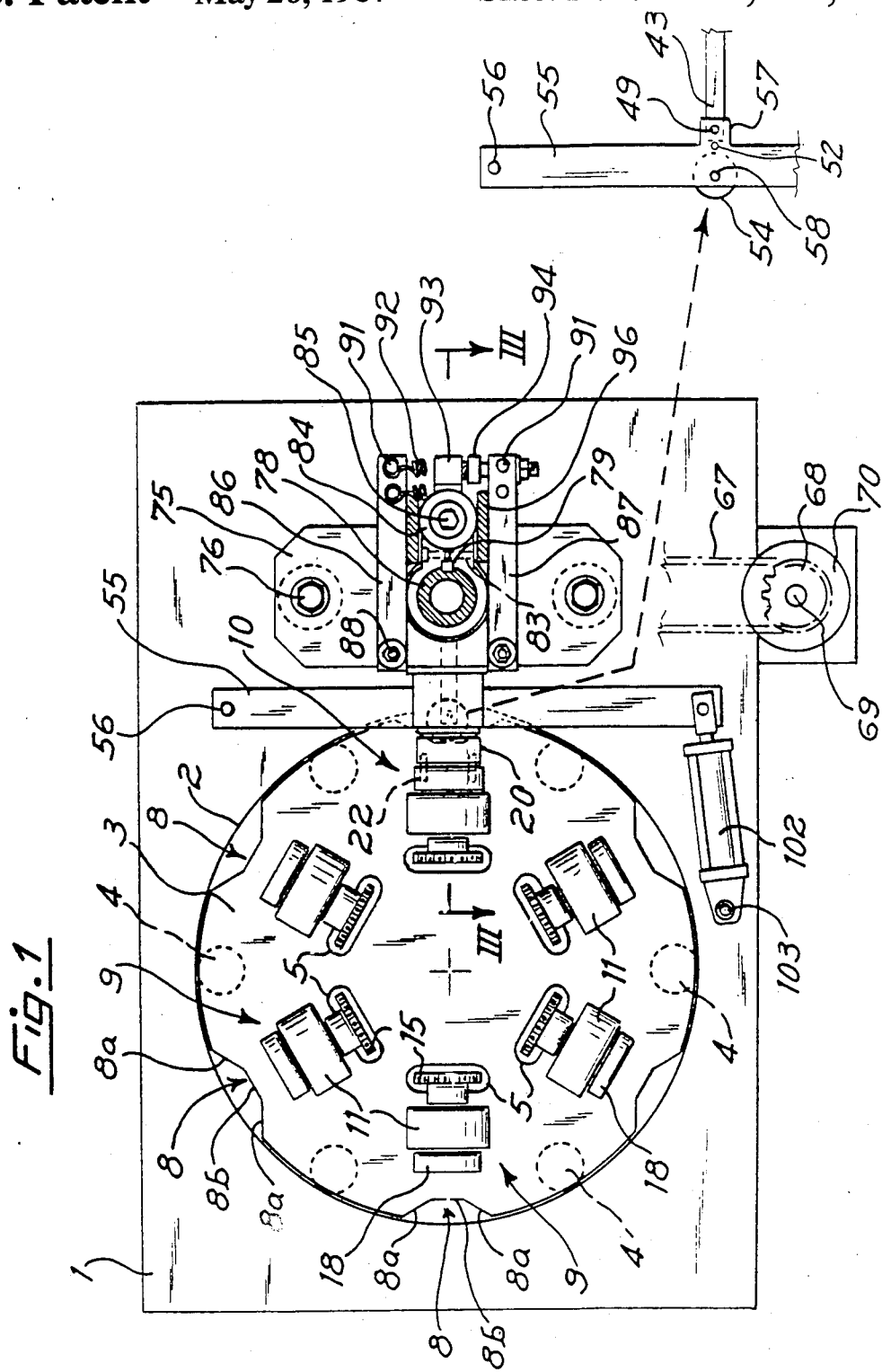

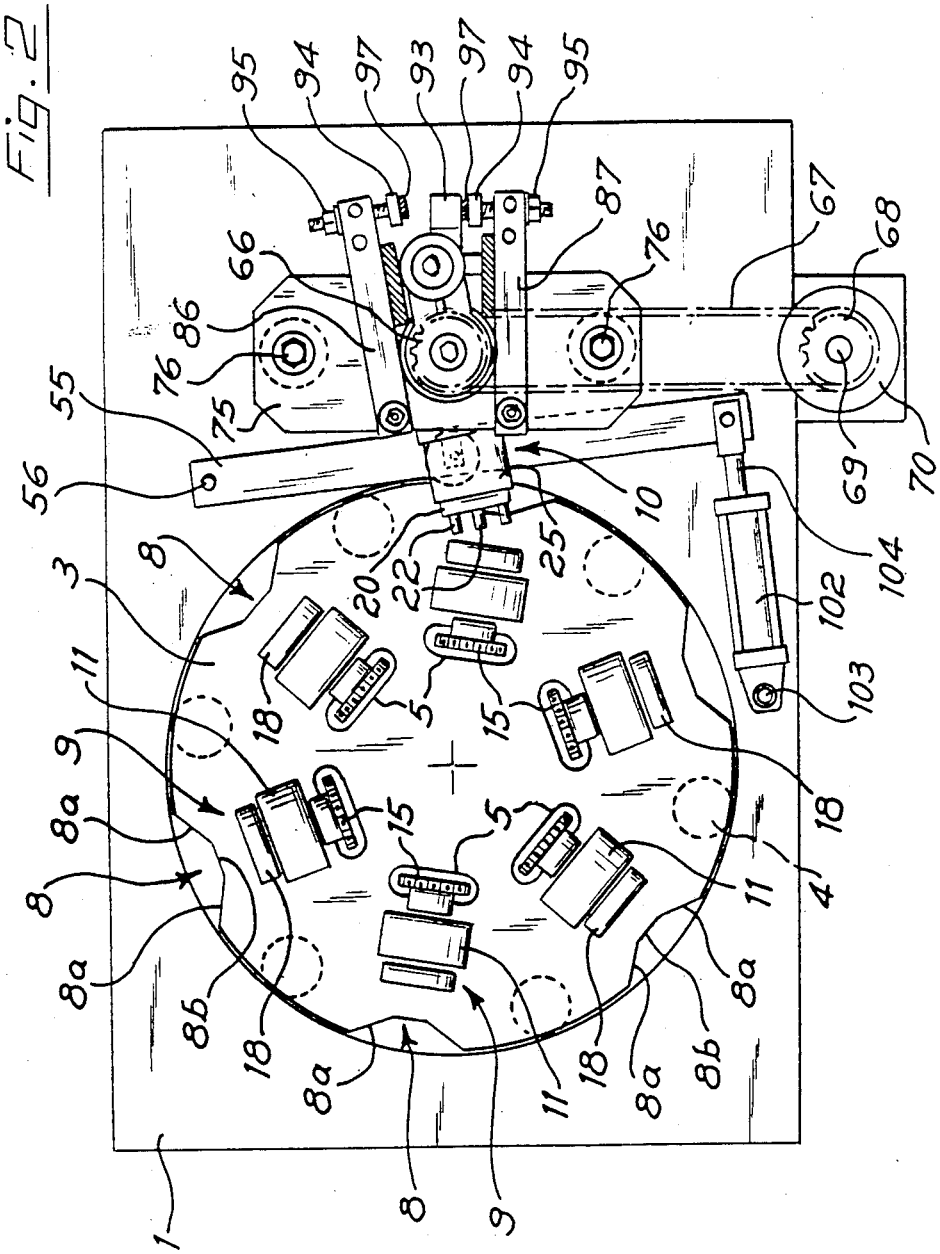

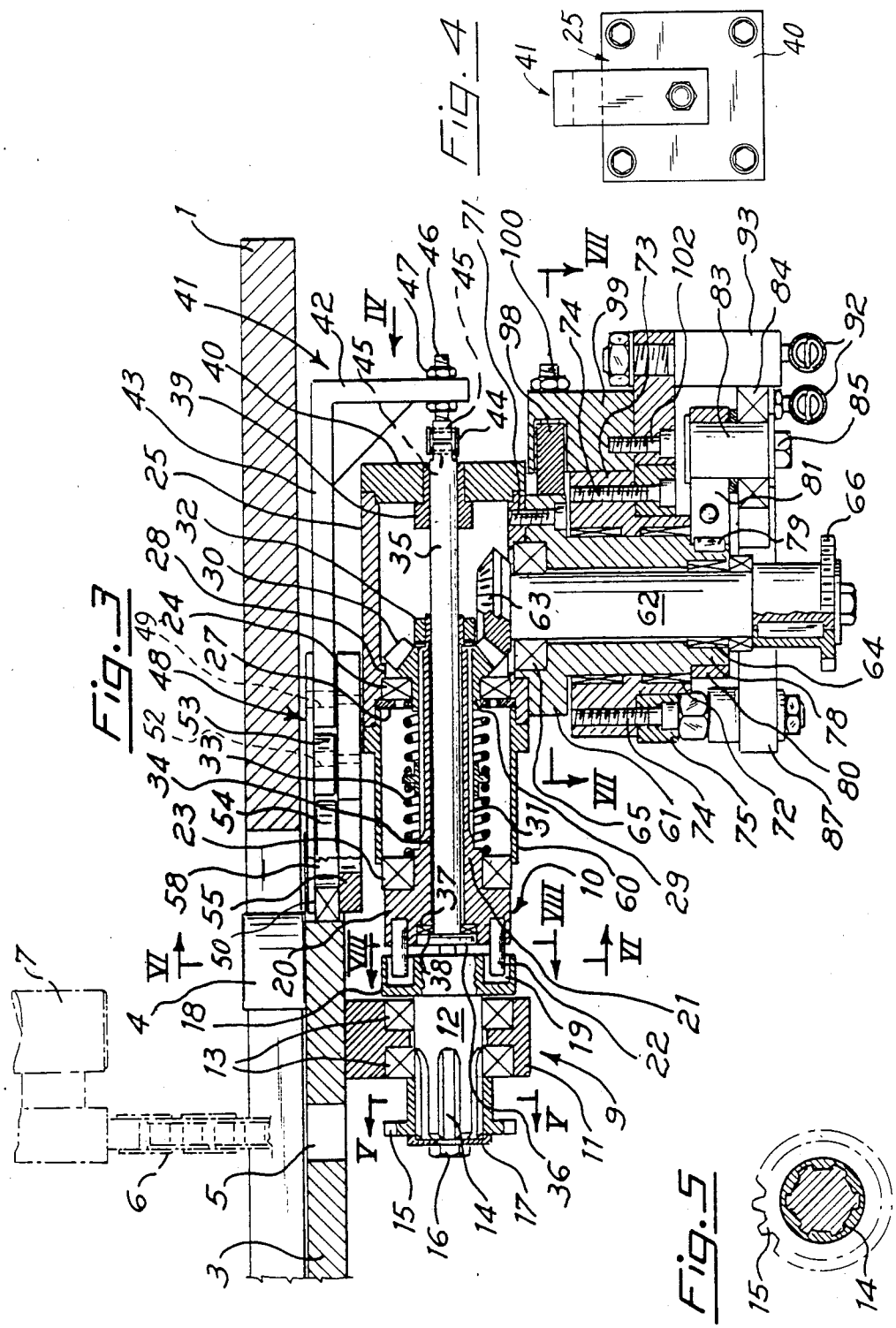

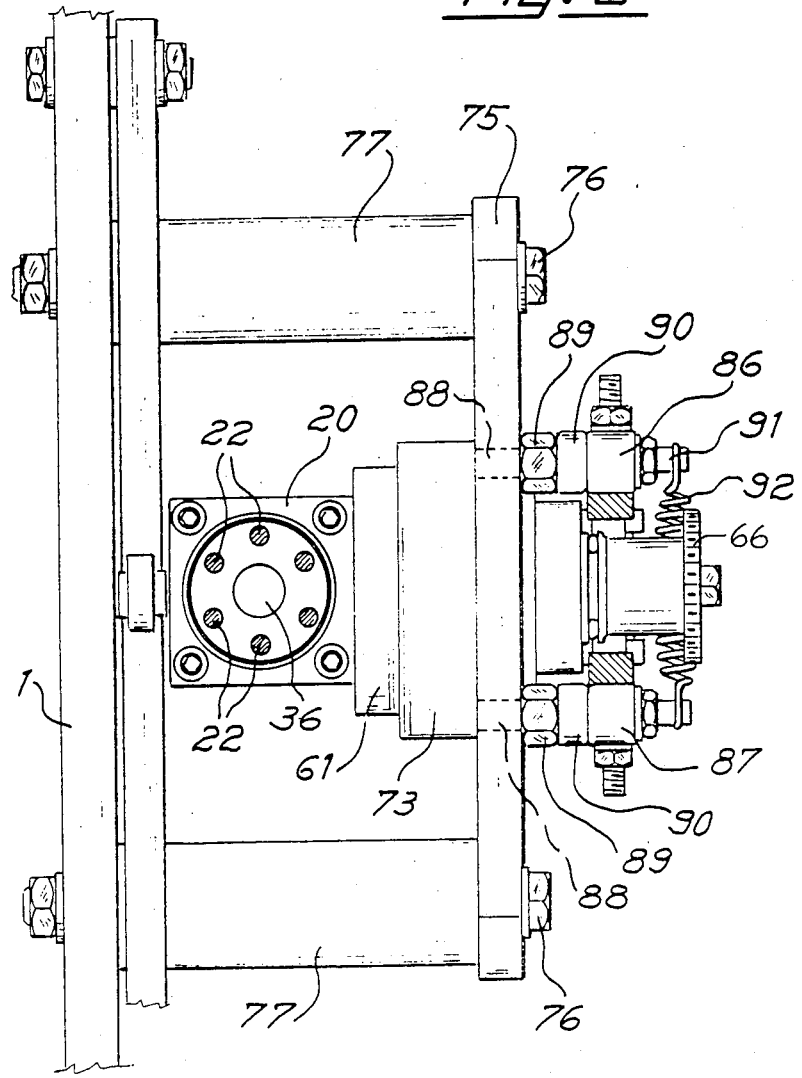

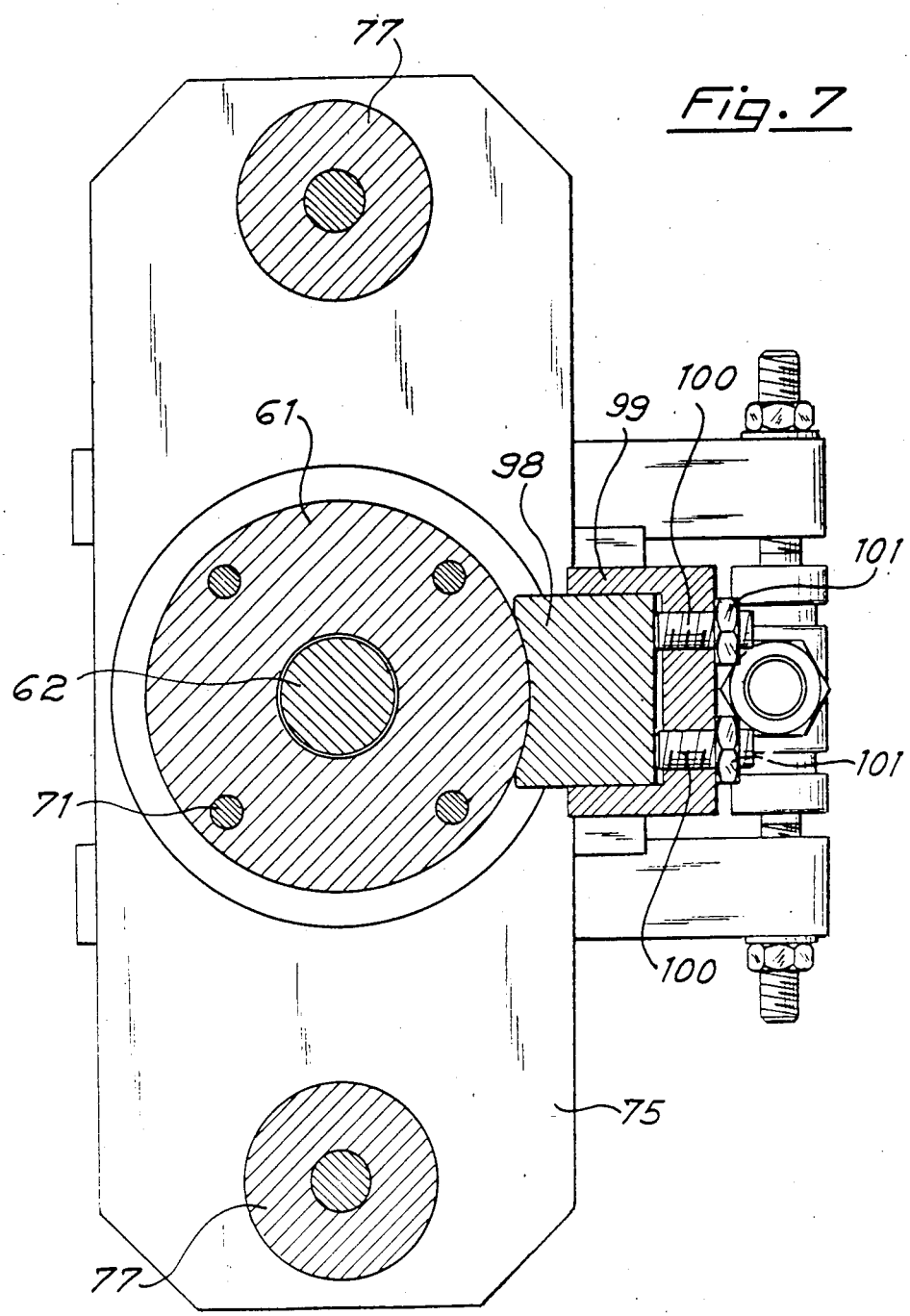

CONTROL DEVICE FOR FEEDING METAL BARS FOR SUPPLYING AN AUTOMATIC MULTI-SPINDLE LATHE

This invention relates to a control device for feeding metal bars through a suitable guide equipment in order to supply a multi-spindle lathe with the bars.

As is known, in a lathe of the above type the spindles are carried on a rotating table or drum of a generally circular shape, and said splindles are located circumferentially equally spaced. Due to the drum rotation the spindles are carried in sequence to the different working stations so as to permit the bar portion protruding from the spindle to be worked on for obtaining the desired piece.

The feeding of bar material to the above lathes is performed therefore by means of a suitable guide equipment provided behind the lathe and generally comprised of a plurality of tubular guides which are also located circumferentially on the same longitudinal axis of the lathe spindles and carried by a rotating frame which rotates syncronously with the drum carrying the spindles.

The device of the invention is suitable to provide the control of the metal bar feeding through the guide equipment to the lathe, particularly to the lathe spindles.

It is to be noted also, in order to better understand the operation of the device according to the invention, that the bar feeding is not continuous, but instead the bar advancement is discontinuous or stepwise, and any step is of a length corresponding to the bar length necessary for obtaining the next desired piece.

The above brief description of the multi-spindle lathe as it relates bar guide equipment has been given only for completeness and for a better understanding of the characteristics of the device according to the present invention. In fact the lathe and the bar guide equipment are not part of this invention, and therefore they will not be further described nor illustrated.

As far as the lathe is concerned, no further description is necessary since it is a well known machine, and the guide equipment can be, for example, the equipment disclosed in the Italian Patent Application No. 21988 A/83 filed on July 8, 1983 by the same Applicant, and which corresponds to U.S. Pat. No. 4,604,924.

Control device for feeding bars to a multi-spindle lathe as above are known are briefly described in the Patent Application No. 20706.

The device of the above cited Patent Application permits elimination of all drawbacks of the conventional devices, as does the device of the present invention; the latter device however implements a technical solution completely different from that of the device of the above Patent Application.

The present device lends itself to mass production, is of simple realization, and requires little service.

In particular, the chains cooperating for the bar feeding can be removed without breaking.

According to another feature of the device according to the present invention, the device permits presentation of several feeding stations preferably but not necessarily in diametrically opposed areas.

According to a further feature of the invention all parts of the device are in sight, so that in case of jamming it is easy to check whether the trouble is to be ascribed to the device or to the lathe or to the bar guide equipment.

Further, the device is applicable without modifications to equipment irrespective of the distance between the guide channels of the metal bars.

The characteristics and advantages of the device according to the present invention will be apparent from the detailed description of a non limiting embodiment taken together with the accompanying drawings, in which:

FIG. 1 is a front view of the device on the side opposed to the side where is the bar guide equipment, the device being shown during the bar feeding;

FIG. 2 is a partial view as FIG. 1, but with the device shown during a transistory dead period;

FIG. 3 is section view of the device taken along the line III—III of FIG. 1;

FIG. 4 is a view of a detail of the device taken along the arrow IV of FIG. 3;

FIG. 5 is a section view of a detail of the device taken along the line V—V of FIG. 3;

FIG. 6 is a section view of the device taken along the line VI—VI of FIG. 3;

FIG. 7 is a section view of the device taken along the line VII—VII of FIG. 3;

Figure 8:
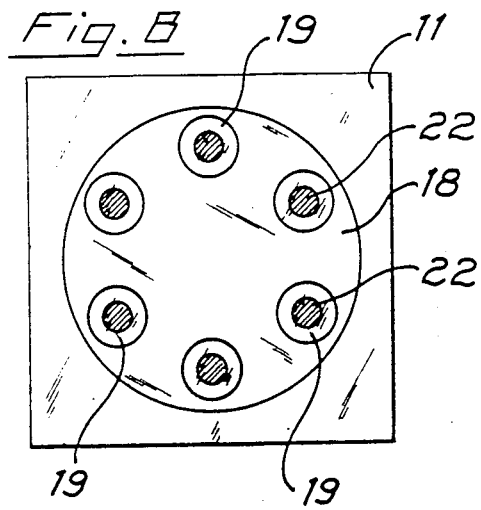
FIG. 8 is a section view taken along the line VIII—VIII of FIG. 3.

With particular reference to FIGS. 1 to 7, the reference numeral 1 indicates the fixed frame of an equipment including the device according to the invention. The portion of frame 1 shown in the FIGS. 1 to 7 is the portion located at the rear end of the bar guide equipment. More precisely, the bar guide equipment is located backwardly in respect of the plane of FIGS. 1 and 2, and the lathe is located in series with said equipment.

Frame 1 (FIGS. 1 and 2) is provided with a circular opening 2, and a plate 3 driven by known means (not shown) can rotate in the inner part of opening 2; said plate is fixed to the rear end of the metal bar guide equipment and is rotatably supported by frame 1 through bearings 4 movable along the inner edge of opening 2.

Plate 3 is provided also with a plurality of apertures 5 angularly equally spaced providing a passageway toward the bar guide equipment for known chain means provided with a suitable bar thrust device, said chains controlling the bar feeding. All the above described elements are known, and a portion thereof is shown by dot lines in FIG. 3, where the reference numeral 6 indicates a chain portion and the reference numeral 7 indicates a portion of the bar thrust device. Since said elements are known as used in this type of equipment, a complete illustration thereof is omitted.

The illustrated embodiment reference will be made to a six-spindle lathe, but it will be clear that the device of the invention can be used in a lathe with any different number of spindles, either higher or lower.

As is clear from FIGS. 1 and 2, plate 3 is provided along the edge with recesses 8, so as to enable said plate to operate substantially as a cam, as will be more apparent in the following.

Recesses 8 are each formed with two straight portions 8a which are sloping inwardly and joining centrally with a straight portion 8b perpendicular to the radius of plate 3.

The first part of the clutch means included in the device of the invention is located facing a corresponding recess 8; said first part is indicated generally by the refence numeral 9. The second part of said clutch means is indicated generally by the reference numeral 10 and is carried by its own drive means located on the frame 1. The axis along which the clutch means are driven toward the engagement position, i.e. the direction along which the first and second part 9 and 10 respectively are connected, has a direction substantially radial in respect of the plate 3.

The first part 9 of the clutch means of the device of the invention is comprised of six generally box-like elements 11, each of the elements 11 being fixed by any known means (not shown) to the plate 3 on the side opposed to the side where the bar guide equipment is located, i.e. on the in sight side of plate 3 as is shown on FIGS. 1 and 2.

With particular reference to FIGS. 3 and 5, inside each of the box-like elements 11 a shaft 12 is rotatably supported by ball bearings 13. One end of each shaft 12 protrudes over plate 3 and one of its apertures 5, and the other end protrudes in the opposite direction.

The end of shaft 12 protruding over the aperture 5 is provided with longitudinal grooves 14 which permit the fitting and locking thereon of a gear wheel 15 to which a bar drive chain 6 is connected. The gear wheel 15 is fixed on said end of shaft 12 by means of a set screw 16 and a washer 17.

The end of the shaft 12 which is opposed to the above end is comprised of a generally cylindrical element 18, which is also shown on FIG. 8, said element 18 being provided with generally cylindrical cavities 19 evenly spaced along a circle. In the embodiment shown, cavities 19 are six in number, but said cavities can be in any number for the aim of the invention, i.e. the number of the cavities can be different from six.

The second part 10 of the clutch means of the device according to the present invention comprises six studs or pins 22 located on the end 20 of a shaped shaft 21, said pins 22 being fixed on the end 20 protruding therefrom. The studs or pins 22 are suitable for their insertion within the cavities 19 of the end 18 of shaft 12, to realize the engagement or coupling between the first and second parts 9, 10 respectively of the clutch means according to the invention. In more detail, as appears in FIG. 3, the external diameter of pins 22 is smaller than the internal diameter of cavities 19 to permit engagement and disengagement operations.

With reference to FIG. 3, on a recessed portion of the shaped shaft 21 is fixed a ball bearing 23 which cooperates with a further ball bearing 24 permitting the shaft 21 to rotate within a generally box-like element 25. The outer shape of element 25 is generally parallelepiped, and the inner shape is in the form of a longitudinal cavity 26 extending along almost the full length of the element.

A washer 27 fixed in a middle portion of cavity 26 holds the ball bearing 24 against an inner annular protruding portion 28 of cavity 26.

A cylindrical portion 29 of a level gear wheel 30 with a generally frontal toothing is rotatably movable within the ball bearing 24. The gear wheel 30 is mounted on the end of shaft 21 in a manner similar to the coupling between gear wheel 15 and shaft 12. To this end the shaft 21 is provided with longitudinal grooves 31 which are in engagement with corresponding protrusions (not shown) of gear wheel 30. The latter gear wheel is held in position by means of a stop nut 32 screwed on the threaded end of the shaft 21. In particular it is to be noted that the gear wheel 30 too cooperates with the inner annular protrusion 28 for locking the ball bearing 24 against the washer 27.

A spring 33 is mounted coaxially with the shaft 21 and engages at one end around the ball bearing 23; the other end of spring 33 engages with the ball bearing 24. Said spring 33 permits bidirectional translation motion of shaft 21 within the box-like element 25. During said translation motion the ball bearing 24 remains at rest, whereas the ball bearing 23 moves correspondingly inside the box-like element 25, since it is not constrained by the latter but follows instead the translational motion of shaft 21.

The shaped shaft 21 is provided with a longitudinal passageway 34. A portion of a pin 35 is mounted inside said passageway and protrudes backwardly from the box-like element 25 thus permitting connection to actuating means for the clutch means described above.

One end of pin 35 is provided with a generally disc-shaped head 36 located inside a generally cylindrical cavity 37 provided on the front side of portion 20 of shaft 21. Between the head 36 of the pin 35 and the bottom of cavity 37 there is mounted a thrust bearing 38.

The opposite end of pin 35 passes through an antifriction sleeve 39 and protrudes outwardly from the box-like element 25 through the base 40.

The described connection of pin 35, shaft 21 and box-like element 25 is suitable for permitting shaft 21 to rotate around pin 35, and pin 35 to control the translation motion of shaft 21, said motion being counteracted by the action of spring 33 when shaft 21 is moved as will be described hereinafter.

The end of pin 35 protruding from the box-like element 25 is connected to one end of a rod 41 generally L-shape. One leg portion 42 of the rod 41 extends at a right angle to frame 1, in particular to the plane of the rotating plate 3, and the other leg portion 43 of the rod 41 extends parallel to said plane.

The end of pin 35 and the leg portion 42 of the rod 41 are mutually connected by means of an articulated element which can be comprised advantageously, for example, of a section comprising a link of a chain, such as chain 6. To this end said articulated element is comprised of two lateral plates 44 mutually connected between two pins 45. Said two pins are fitted, free for rotation, in a corresponding hole of the end portion of the pin 35 and in an end portion of increased diameter of an adjusting screw 46, respectively. By means of two adjusting nuts 47 said screw permits change of the distance between portion 42 of the rod 41 and the above described articulated element.

The second leg 43 of the rod 41 permits the engagement of the above described portion of the device according to the invention with the cam plate 3 by virtue of means described below.

The end portion 43 of rod 41, on the side of plate 3, is pivoted by means of a pin 49, to a vertically extending arm 55 which is pivoted at its upper end on the frame 1 by means of a pin 56. More precisely, as illustrated in the enlarged detail in FIG. 1, the end of portion 43 of the rod 41 is pivoted in a protrusion 57 of the arm 55 so as to permit the mounting of a bearing on the arm 55 in a manner described below.

A plate 50 is fixed to arm 55 (FIG. 3) in a middle portion thereof corresponding to pin 49; said plate with the arm 55 and its protrusion 57 forms an element substantially in the shape of a double U. Plate 50 is connected to arm 55 by means of a pin 52 and a spacer 53 mounted on said pin. In this manner the two right hand legs (as viewed on FIG. 3) of the double-U shaped element permit to pivotally connect the end of portion 43 of rod 41 to the arm 55, and to maintain said pivot connection. The other two legs of the double U shaped element permit to mount free for rotation a bearing 54 by means of a pin 58. The bearing 54 protrudes partially from arm 55 and remains at any time in contact with the lateral surface of cam plate 3.

A sleeve member 61 is fixed to the side wall 60 of box-like element 25 and a shaft 62 is rotatably mounted inside said sleeve. On one end of shaft 62, inside the box-like element 25, is keyed a bevel gear wheel 63 which engages at any time with the gear wheel 30 keyed on shaft 21. Rotation of shaft 62 is permitted by virtue of the bearings 64 and 65.

On the other end of shaft 62 there is keyed a gear wheel 66 which is linked (FIG. 2) by means of a chain 67 to a gear wheel 68 which is keyed on the shaft 69 of an hydraulic motor 70.

The attachment of the sleeve member 61 to the side wall of the box-like element 25 is effected by any well known means, for example and as is illustrated in FIG. 3, by lock screws 71, only one of which is shown in the Figure.

The sleeve member 61 is rotatable through bearing 72 within a generally cylindrical member 73 which is attached by means of lock screws 74 to a plate 75. Plate 75, as illustrated in particular on FIGS. 6 and 7, is attached by means of the support pins 76 and the spacers 77, to frame 1.

On the end 78 of the sleeve member 61 protruding from the cylindrical member 73 is keyed with a key 79 a nearly annular element 80 which extending in the radial direction two, registering arms 81, 82 which are held one against the other by means of a lock screw. The arms 81, 82 are provided each with confronting seats (not shown) which are generally semicylindrical in shape permitting them to enclose a shaft 83 passing transversely through the plane formed by the arms 81, 82. On the protruding end of the shaft 83 is mounted a bearing 84 which is held on the shaft 83 by means of a screw and washer assembly 85.

With the bearing 84 are engaged a first arm 86 located upwardly in respect of said bearing and a second arm 87 located downwardly, said two arms being thus generally mutually parallel one another in the rest condition, and also parallel to the longitudinal axis to the box-like element 25, and more particularly parallel to the longitudinal axis of the pin 35.

With particular reference to FIG. 6, and also to FIG. 3 in which however only the lower arm 87 of the two arms is illustrated, the arms 86 and 87 are connected to the plate 75 in such a way that each of the arms can pivot about one end in a plane generally parallel to the plane of said plate. To this end for each arm 86 and 87 a screw 88 is provided, said screw being screwed on the plate 75 and fixed to said plate by means of a nut 89. An antifriction bushing 90 is mounted between the nut 89 and the respective ends of the arms 86 and 87 which can thus pivot as above described.

At the ends of the arms 86 and 87 respectively opposed to the ends referred to above there are two pins 91. The two pins 91 of each arm, respectively, are connected by means of a pair of springs 92. The function of springs 92 is to draw nearer the ends of the arms 86, 87. Pivotal movements of arms 86, 87 caused by spring 92 are stopped by means of a limit stop arm 93. Pins 94 are set in adjustable positions on the ends of arms 86, 87 for engagement with arm 93. To this end pins 94 are provided with threaded stems which are screwed on the end of arms 86, 87 respectively, with nuts 95 for locking said pins in a desired position.

The limit stop arm 93 is attached by known means (not shown) to the plate 75 at height such that, as is apparent particularly from FIG. 1, its middle longitudinal axis contains the center of rotation of shaft 62. To reduce noise caused by possible impacts between arms 86, 87 respectively with bearing 84 and with limit stop arm 93, the arms 86, 87 are provided with rubber strips 96 which directly contact the bearing 84, and the ends of pins 94 are provided with rubber blocks 97 which directly contact the limit stop arm 93.

The device according to this invention includes also brake means for lowering the rotational speed of the sleeve member 61, and further brake means for lowering the sliding speed of the shaped shaft 21 inside the box-like element 25.

The first above brake means comprise (with reference particularly also to FIG. 7) a rubber block 98 press fitted into a container member 99 and protruding partially therefrom. Said block engages by its front surface having a generally circular profile with the edge portion of the member 61. As the rubber block 98 wears out, it is driven gradually out the container 99. To this end, adjusting screws 100 screwed on the back side of container 99 and locked in the desired positions by means of nuts 101 are provided. The container member 99 is fixed, e.g. by means of locking screws 102, on the limit stop arm 93.

The above further brake means comprise (FIGS. 1 and 2) a pneumatic piston 102; the cylinder of said piston is pivoted at 103 on frame 1, and the stem 104 is pivoted on the lower end of arm 55.

According to one characteristic of the device of the present invention, piston 102 function as a brake means in that it is a piston of a known type featuring the stroke in one direction of its stem 104 with a speed sufficiently high, whereas the stroke of said stem in the opposite direction takes places with a remarkably lower speed. In this case the high speed stroke corresponds to the disengagement conditions illustrated in FIG. 2, i.e. the counterclockwise rotation of arm 55, whereas the low speed stroke corresponds to the engagement condition, i.e. the clockwise rotation of arm 55 when the parts 9, 10 of the clutch means are engaging one another. In this way the engagement operation of the two parts of the clutch means 9, 10 is effected gradualy and without any jamming.

Jamming of clutch means 9, 10 is avoided also because the hydraulic motor 70 is suitably operated when the two parts 9, 10 of the clutch means are engaging one another. To this end the hydraulic motor 70 when controlling the feed of the bars with the clutch means engaged rotates at a high speed or at the speed most suitable for feeding the bars. As the clutch means are about to engage, the speed of motor 70 is caused to lessen drastically so as to lessen considerably the rotational speed of the shaft 21 carrying the pins 22, and said speed is sufficient to guarantee that pins 22 enter into cavities 19 as said pins are approaching cavities 19 wherein they have to penetrate. If on the contrary the rotational speed of shaft 21 were high, there will be unavoidably undesirable phenomena liable to cause breaking of pins 22 and breaking off service of the device.

Variations of the rotational speed of the hydraulic motor 70 can be obtained by any suitable means (not shown), e.g. by electrical and/or electronic circuitry operating synchronously with the drive circuitry of the device.

The operation of the device according to the present invention is described in the following as far as the essential steps are concerned.

Assume to start from the condition illustrated in FIG. 1, i.e. the condition in which the clutch means 9, 10 are mutually engaged and the hydraulic motor is functioning to control the bar feed. To this end the motor is actuated at a high speed, so that the rotational movements of the gear wheel 68 are transmitted through the chain 67 to the gear wheel 66, and therefore the shaft 62 causes the rotational movement of the shaft 21 through the gear wheels 63 and 30. Consequently the gear wheel 15 is caused to rotate and the chain 6 is caused to move.

As the forward movement of the bar in the considered channel (i.e. the right-side intermediate channel in FIGS. 1 and 2) is completed, the hydraulic motor 70 stops and the plate 3 is caused to rotate by known means, so that the bearing 54 provided on the arm 55 is caused to move onto the outer periphery of plate 3. This causes a counterclockwise rotation of arm 55 and therefore a linear movement of the L-shaped rod 41, so that its portion 42 moves away from the box-like element 25. This in turn causes, through the articulated connection 44, a sliding movement of the shaft 21 inside the box-like element 25 driven by the pin 35. The pins 22 of said shaft are therefore withdrawn from the cavites 19 of the element 18 so as to permit the disengagement of clutch means, as is shown in FIG. 2.

According to one of the main characteristics of the present invention, the disengagement of the clutch means is not effected along a straight axis, since in that case the device would be quite complicated, and even unrealizable. In fact the above described assembly carrying the part 10 of the clutch means undergoes a swinging or pivotal movement, as is in particular illustrated in FIG. 2 during an intermediate step.

Said pivotal movement results because the box-like element 25 is made integral with the sleeve member 61 which can rotate inside the cylindrical member 73 carried by the plate 75. In this manner when the plate 3 is driven in rotation to disengage the clutch means, the pins 22 are not located on a rigid fixed member, in which case the disengagement would be impossible, but are instead on a moving member which rotates and follows the corresponding rotation of plate 3.

In the above described step of disengagement of the clutch means, one of the arms 86, 87 is pivoted, in particular the upper arm 86 is caused to pivot counteracting the springs 92. At the completion of disengagement of the clutch means, said arm 86 moves to carry the box-like element 25 with the clutch means associated therewith back to the starting position, by acting on the sleeve member 61 through bearing 84, arms 81 and 82, and also annular element 80 keyed on the sleeve member 61. Therefore the device from the position of FIG. 2 returns automatically to the position of FIG. 1 in which the clutch means are again mutually engaged, obviously with the corresponding station of the next guide channel.

The above described arrangement is of particular advantage because due to the provision of the above described rubber elements vibrations, shocks, noise of the equipment are eliminated, and also because in case of an accidental inversion of the direction of rotation of plate 3 (for example due to a drive error), the clutch means would disengage even in the direction opposite to that considered above, and such disengagment would be effected in the same way, with one only exception, i.e. in that case the arm 87 will rotate downwardly, and the upper arm 86 would remain at rest.

In FIGS. 9 to 13, alternative clutch means which could be used in lieu of the above clutch means are shown by way of example.

Said alternative means are not described in detail since they are known per se, and in addition they could be substituted with other equivalent means. In the Figures the two parts which comprises said means are generally indicated with the same reference numerals 9 and 10 as the parts hereinbefore described; obviously the first part 9 should be arranged in the same way as the corresponding part of the clutch means hereinbefore described, and similarly the second part 10 should be arranged as the corresponding part of the clutch means hereinbefore described.

Figure 9:
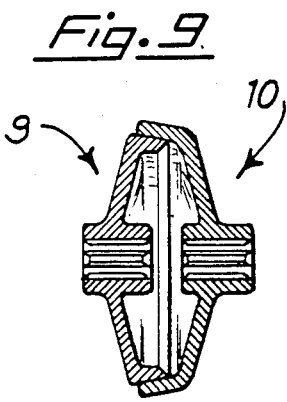
FIGS. 9, 10, 11, 12 and 13 show different embodiments of the clutch means included in the device of the invention.
Figure 10:
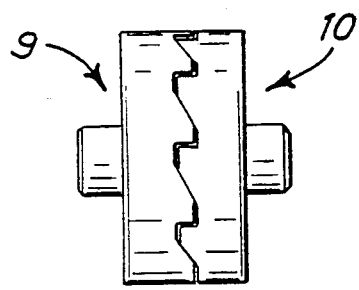

In FIG. 9 the clutch means are comprised of a conical friction device with a front type engagement, whereas in FIG. 10 the clutch means are comprised of saw-toothed front gears.

Figure 11:
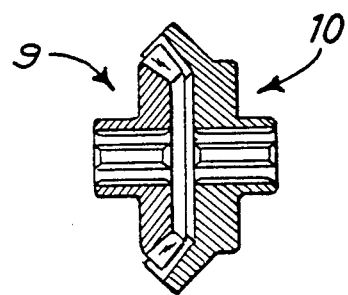
Figure 12:
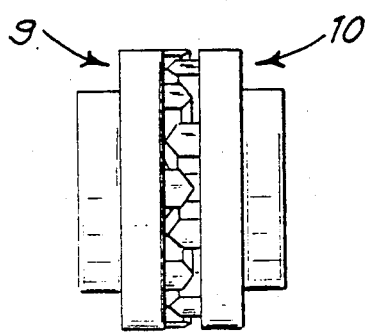

FIG. 11 shows clutch means comprised of two gears having generally conical front toothing, and in FIG. 12 clutch means comprised of two front trapezoid toothing are shown.

Figure 13:
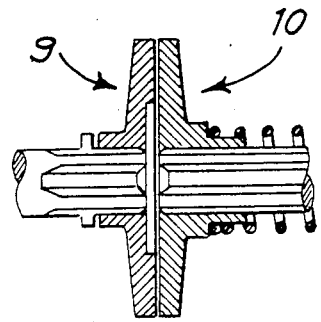

The clutch means shown in FIG. 13 are comprised of a plane clutch with front engagemant.

It should be understood the changes and/or modifications in the device according to the present invention can be made without departing from the spirit and scope of the invention.

I claim:

1. In apparatus for feeding metal bars to an automatic multi-spindle lathe, including drive means, and bar guide equipment having a frame, a rotatably indexible plate on said frame, a plurality of rotatable bar feeding devices mounted on said plate to be indexed thereby one by one into an operating position on said frame, the improvement comprising clutch means for releasably connecting said drive means to each of said devices upon movement thereof into said operating position, thus causing the feeding of metal bars one at a time through said equipment, said clutch means comprising at least a first part connected to each of said bar feeding devices and arranged on said plate to rotate with said plate, and at least a second part movably carried by said frame, and means on said frame cooperating with said rotating plate and operable to cause the engagement and disengagement of said first and second parts each time one of said devices moves into and out of, respectively, said operating position, said second part of said clutch being secured to a rod mounted on said frame for limited translational movement, and said rotating plate being provided along its edge with shaped recesses, the number of said recesses being the same as the number of said first parts of said clutch means, and being formed in angular correspondence about the axis of said plate with each of said first parts, said plate providing substantially a rotating cam engaging with said rod for controlling the movement thereof and consequent engagement and the disengagement of said second part with said first part.

2. Apparatus according to claim 1, characterized in that said rod is comprised of a generally L-shaped rod, one end of said rod cooperating through at least one bearing with the edge of the rotating plate and the other end of said rod being articulatedly connected to a pin connected to said second part of said clutch means.

3. Apparatus according to claim 2, characterized in that said pin is located within a shaped shaft which is rotatable and slidable within a box-like element, said second part of said clutch means being provided on one end of said shaped shaft, and means for connection to the main control or drive means being provided on the other end of said shaped shaft.

4. Apparatus according to claim 3, characterized in that said box-like element carrying said second part of said clutch means is rotatable around an axis which is generally parallel to the rotation axis of said rotatable plate.

5. Apparatus according to claim 4, characterized in that said box-like element is pivotable both in a clockwise direction and in a counterclockwise direction.

6. Apparatus according to claim 3, characterized in that a first bearing and a second bearing are provided between said shaped shaft and said box-like element generally in correspondence with the ends of said shaped shaft, said first and second bearings being suitable to permit rotation of said shaft said first bearing being secured to said shaft for sliding movement therewith.

7. Apparatus according to claim 3, characterized in that said shaped shaft has secured thereon a toothed wheel which is operatively connected to the drive means.

8. Apparatus according to claim 5, characterized in that said box-like element is integral with a sleeve member rotatable within a cylindrical member fixed to a bracket which is integral with said frame.

9. Apparatus according to claim 8, characterized in that a second shaft is rotatable within said sleeve member, on one end of said second shaft being keyed a first gear wheel in engagement with a second gear wheel arranged on said shaped shaft, and on the other end of said second shaft is keyed a further gear wheel connected to said drive means.

10. Apparatus according to claim 9, characterized in that a second pair of arms integral with said sleeve member cooperate with an intermediate portion of said first pair of arms through interposition of a rotatable element.

11. Apparatus according to claim 11, characterized in that cushioning means are interposed between the portions of said first pair of arms which cooperate with said rotatable element and the end portions of said arms which are engagable with said limit stop arm.

12. Apparatus according to claim 8, characterized in that a limit stop arm is fixed to said bracket, at one of their ends a first pair of arms are engaging said limit stop arm, the other ends of said first pair of arms being pivoted to said bracket, said one ends of said first pair of arms being mutually connected through spring means.

13. Apparatus according to claim 8, characterized in that a rubber block carried in an adjustable position by a container member integral with said bracket is engaged with a portion of said sleeve member.

14. Apparatus according to claim 2, characterized in that said one end of said rod is pivotally connected to an arm pivoted at one end on said fixed frame and connected at its other end to a fluid operated piston.

15. Apparatus according to claim 14, characterized in that said piston permits a high speed pivoting of said arm during the disengagement movement of said clutch means and a low speed pivoting during the engagement movement of said clutch means.

16. Apparatus according to claim 1, characterized in that said drive means rotates at a high speed during the feed movement of the metal bars and rotates at low speed during the engagement and disengagement movements of said clutch means.

17. Apparatus according to claim 1, characterized in that said first part of said clutch means comprises a generally cylindrical element provided on one side with cavities for receiving connecting pins located on said second part of said clutch means.

* * * * *